United States Patent
Lee et al.

(10) Patent No.: US 10,764,838 B2
(45) Date of Patent: Sep. 1, 2020

(54) METHOD FOR RECEIVING BRS AND PBCH IN WIRELESS COMMUNICATION SYSTEM AND DEVICE FOR SAME

(71) Applicant: LG Electronics Inc., Seoul (KR)

(72) Inventors: Kilbom Lee, Seoul (KR); Kijun Kim, Seoul (KR); Kyuseok Kim, Seoul (KR); Minki Ahn, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 16/328,830

(22) PCT Filed: Jul. 25, 2017

(86) PCT No.: PCT/KR2017/007977
§ 371 (c)(1),
(2) Date: Feb. 27, 2019

(87) PCT Pub. No.: WO2018/048091
PCT Pub. Date: Mar. 15, 2018

(65) Prior Publication Data
US 2019/0215782 A1    Jul. 11, 2019

Related U.S. Application Data

(60) Provisional application No. 62/384,183, filed on Sep. 6, 2016.

(51) Int. Cl.
*H04W 52/32* (2009.01)
*H04L 5/00* (2006.01)
(Continued)

(52) U.S. Cl.
CPC .......... *H04W 52/32* (2013.01); *H04L 1/00* (2013.01); *H04L 5/00* (2013.01); *H04L 5/0048* (2013.01);
(Continued)

(58) Field of Classification Search
CPC . H04W 52/32; H04W 52/322; H04W 52/325; H04L 5/0048
See application file for complete search history.

(56) References Cited

U.S. PATENT DOCUMENTS

| | | | |
|---|---|---|---|
| 2015/0043369 A1* | 2/2015 | Kim | H04W 24/08 370/252 |
| 2015/0078257 A1* | 3/2015 | Wu | H04J 11/0036 370/328 |
| 2016/0157267 A1 | 6/2016 | Frenne et al. | |

FOREIGN PATENT DOCUMENTS

| | | |
|---|---|---|
| KR | 1020140023690 A | 2/2014 |
| WO | 2016086144 A1 | 6/2016 |

OTHER PUBLICATIONS

Nokia, Alcatel-Lucent Shanghai Bell, Verizon Wireless, "Frame Structure Support for Beam Based Common Control Plane", 3GPP TSG-RAN WG1 #86, Aug. 22-26, 2016, R1-167265.
(Continued)

*Primary Examiner* — Hoon J Chung
(74) *Attorney, Agent, or Firm* — Dentons US LLP

(57) ABSTRACT

A method for a terminal receiving a beam reference signal (BRS) and a physical broadcast channel (PBCH) in a wireless communication system can comprise the steps of: determining a power ratio of BRS to PBCH per resource element (RE) on the basis of the number of BRS ports; detecting the BRS and a demodulation reference signal (DMRS) on the basis of the number of the BRS ports; and determining whether or not the determined power ratio of BRS to PBCH is to be compensated to an estimated channel on the basis of the DMRS.

18 Claims, 9 Drawing Sheets

(51) Int. Cl.
*H04L 1/00* (2006.01)
*H04L 25/02* (2006.01)
*H04W 52/14* (2009.01)

(52) U.S. Cl.
CPC ........... *H04L 25/02* (2013.01); *H04W 52/322* (2013.01); *H04W 52/325* (2013.01); *H04W 52/143* (2013.01)

(56) References Cited

OTHER PUBLICATIONS

Nokia, Alcatel-Lucent Shanghai Bell, Verizon Wireless, "Multi-Beam Common Control Plane Design", 3GPP TSG-RAN WG1 #86, Aug. 22-26, 2016, R1-167280.

* cited by examiner

METHOD FOR RECEIVING BRS AND PBCH IN WIRELESS COMMUNICATION SYSTEM AND DEVICE FOR SAME

This application is a 35 USC § 371 national stage entry of international application no. PCT/KR2017/007977 filed on Jul. 25, 2017, and claims priority to U.S. provisional application no. 62/384,183 filed on Sep. 6, 2016, all of which are hereby incorporated by reference in their entireties as if fully set forth herein.

TECHNICAL FIELD

The present invention relates to wireless communication, and more particularly, to a method for receiving a beam reference signal (BRS) and a physical broadcast channel (PBCH) in a wireless communication system and a device for the same.

BACKGROUND ART

In a next generation 5G system, scenarios can be classified by enhanced Mobile BroadBand and (eMBB), ultra-reliable Machine-Type Communications (uMTC), massive Machine-Type Communications (mMTC), and the like. The eMBB corresponds to a next generation mobile communication scenario having characteristics such as high spectrum efficiency, high user experienced data rate, high peak data rate, and the like. The uMTC corresponds to a next generation mobile communication scenario having characteristics such as ultra-reliable, ultra-low latency, ultra-high availability, and the like (e.g., V2X, emergency service, remote control). The mMTC corresponds to a next generation mobile communication scenario (e.g., IoT) having characteristics such as low cost, low energy, short packet, and massive connectivity.

No method for receiving/decoding a BRS and a PBCH in the next generation 5G system has been proposed specifically.

Disclosure

Technical Problem

An object of the present invention is to provide a method for receiving a beam reference signal (BRS) and a physical broadcast channel (PBCH) by a user equipment (UE) in a wireless communication system.

Another object of the present invention is to provide a user equipment (UE) for receiving a beam reference signal (BRS) and a physical broadcast channel (PBCH) in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve the above technical objects, a method for receiving a beam reference signal (BRS) and a physical broadcast channel (PBCH) by a user equipment (UE) in a wireless communication system may comprises determining a power ratio of the BRS to the PBCH per resource element (RE) based on a number of BRS ports; detecting the BRS and a demodulation reference signal (DMRS) based on the number of BRS ports; and determining whether to compensate the determined power ratio of the BRS to the PBCH for a channel estimated based on the DMRS.

The determining may include determining that the power ratio of the BRS to the PBCH is not compensated when the determined power ratio of the BRS to the PBCH is 1, and the method further comprises decoding the PBCH based on the channel not compensated. The number of BRS ports may be 4 or 8.

The determining may include determining that the power ratio of the BRS to the PBCH is compensated when the determined power ratio of the BRS to the PBCH is not 1, and the method further comprises decoding the PBCH based on the channel compensated by compensating the determined power ratio of the BRS to the PBCH. The number of BRS ports may be 2.

The method may further comprises receiving a synchronization signal; and obtaining the number of BRS ports by using the synchronization signal. The synchronization signal may include a Primary Synchronization Signal (PSS), a Secondary Synchronization Signal (SSS), or an Extended Synchronization Signal (ESS). The number of BRS ports may be configured cell-specifically or UE-specifically. The number of BRS ports may be indicated by a signature defined based on a scrambling code of the synchronization signal.

To achieve the above technical objects, a user equipment (UE) for receiving a beam reference signal (BRS) and a physical broadcast channel (PBCH) in a wireless communication system may comprises a processor configured to determine a power ratio of the BRS to the PBCH per resource element (RE) based on a number of BRS ports, detect the BRS and a demodulation reference signal (DMRS) based on the number of the BRS ports, and determine whether to compensate the determined power ratio of the BRS to the PBCH for a channel estimated based on the DMRS.

The processor may determine that the power ratio of the BRS to the PBCH is not compensated when the determined power ratio of the BRS to the PBCH is 1, and the processor may be configured to decode the PBCH based on the channel not compensated. The number of BRS ports may be 4 or 8.

The processor may determine that the power ratio of the BRS to the PBCH is compensated when the determined power ratio of the BRS to the PBCH is not 1, and the processor may be configured to decode the PBCH based on the channel compensated by compensating the determined power ratio of the BRS to the PBCH. The number of BRS ports may be 2.

The UE may further comprises a receiver configured to receive a synchronization signal, and the processor may be configured to obtain the number of BRS ports by using the synchronization signal. The synchronization signal may include a Primary Synchronization Signal (PSS), a Secondary Synchronization Signal (SSS), or an Extended Synchronization Signal (ESS). The processor may obtain the number of BRS ports indicated by a signature defined based on a scrambling code of the synchronization signal. The number of BRS ports is configured cell-specifically or UE-specifically.

Advantageous Effects

According to one embodiment of the present invention, a coverage problem may be solved by BRS and PBCH design varied depending on the number of BRS ports and a PBCH may be decoded efficiently.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this specification, illustrate embodiments of the invention.

BEST MODE FOR CARRYING OUT THE INVENTION

Figure 1:
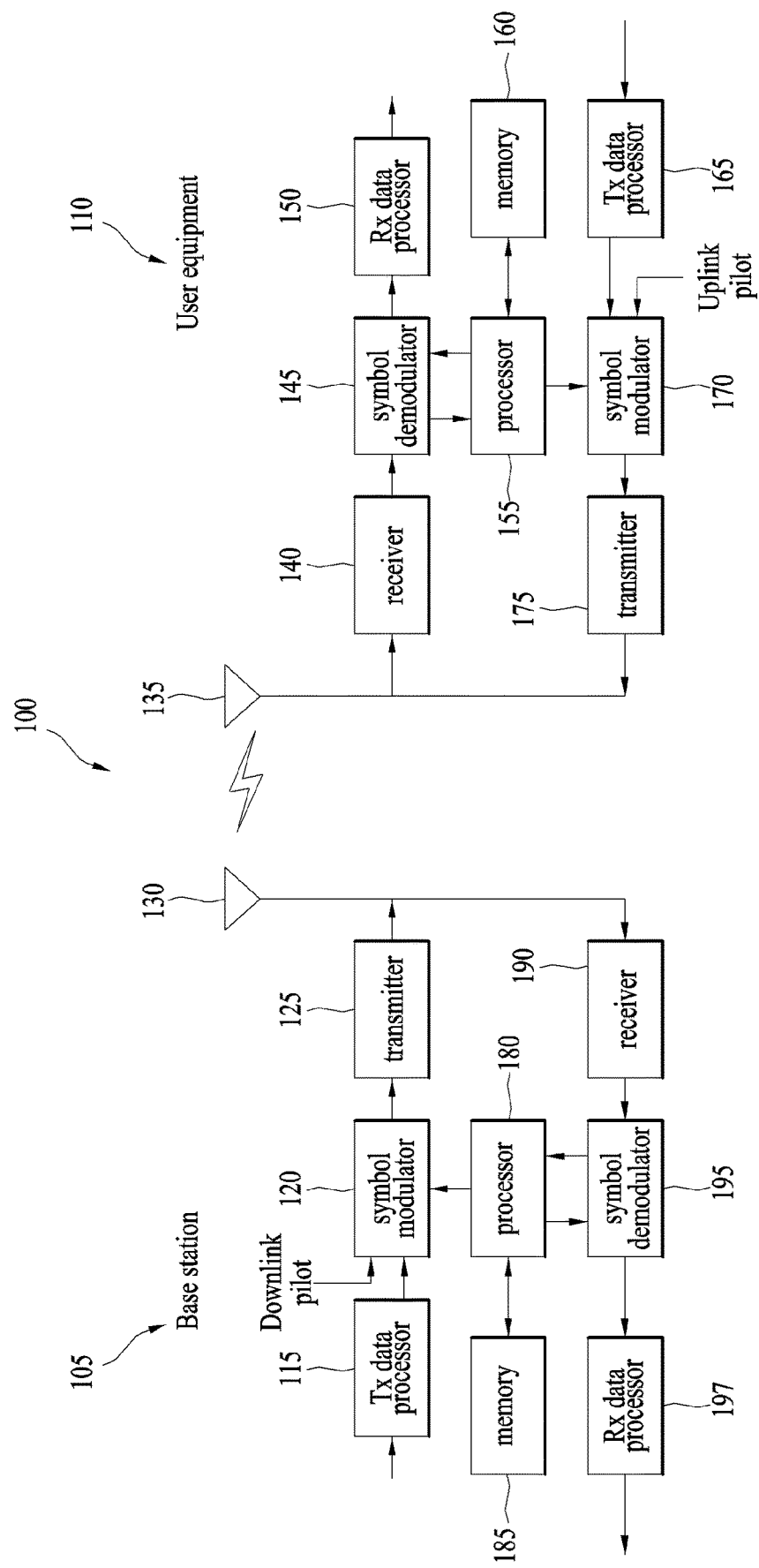
FIG. 1 is a block diagram illustrating configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, LTE-A system, 5G system, the following descriptions are applicable to other random mobile communication systems in a manner of excluding unique features of the 3GPP LTE, LTE-A system, 5G system.

Also, in the following description, specific terminologies are provided to help the understanding of the present invention, and the use of the specific terminology can be modified into another form within the scope of the technical spirits of the present invention.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such an arbitrary node of a network stage communicating with a terminal as a Node B (NB), an eNode B (eNB), an access point (AP) and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

Moreover, in the following description, specific terminologies are provided to help the understanding of the present invention, and the use of the specific terminology can be modified into another form within the scope of the technical spirits of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135. The transmitter and the receiver at the user equipment and the base station may be implemented with one radio frequency (RF) unit.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110. The transmitter and the receiver may be implemented with one RF unit.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal and a storing function without being specially mentioned.

Figure 2:
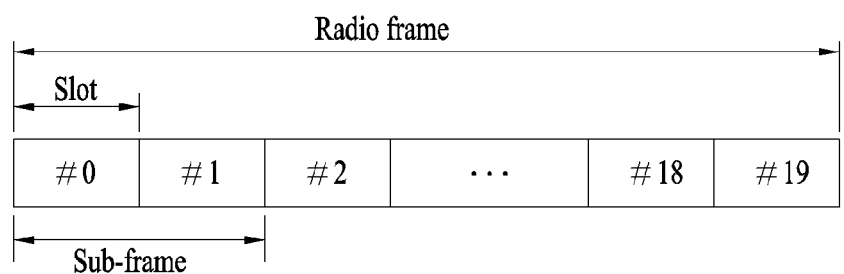
FIG. 2 is a diagram illustrating a frame structure of LTE/LTE-A system.

FIG. 2 is a diagram for LTE/LTE-A frame structure.

Referring to FIG. 2, one frame is 10 ms, and comprises 10 1ms subframes. One subframe comprises 2 0.5 ms slots, and one slot 7 orthogonal frequency division multiplexing symbols. One resource block (RB) is defined as 12 subcarriers having 15 kHz spacing and 7 OFDM symbols. A base station transmits primary synchronization signal (PSS), secondary synchronization signal (SSS) for synchronization and physical broadcast channel (PBCH) for system information at the center frequency 6 RBs. Herein, the frame structure and the positions of signals and channels may vary depending on normal/extended cyclic prefix (CP), time division duplex (TDD)/frequency division duplex (FDD).

Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

One resource block (RB) is defined by 12 subcarriers and 7 OFDM symbols of an interval of 15 kHz. The base station transmits a primary synchronization signal (PSS), a secondary synchronization signal (SSS) and a physical broadcast channel (PBCH) for system information in 6 RBs of a center frequency. In this case, there may be a difference in a structure, signal and channel of the radio frame structure in accordance with normal/extended cyclic prefix (CP), and time division duplex(TDD)/frequency division duplex (FDD).

Figure 3:
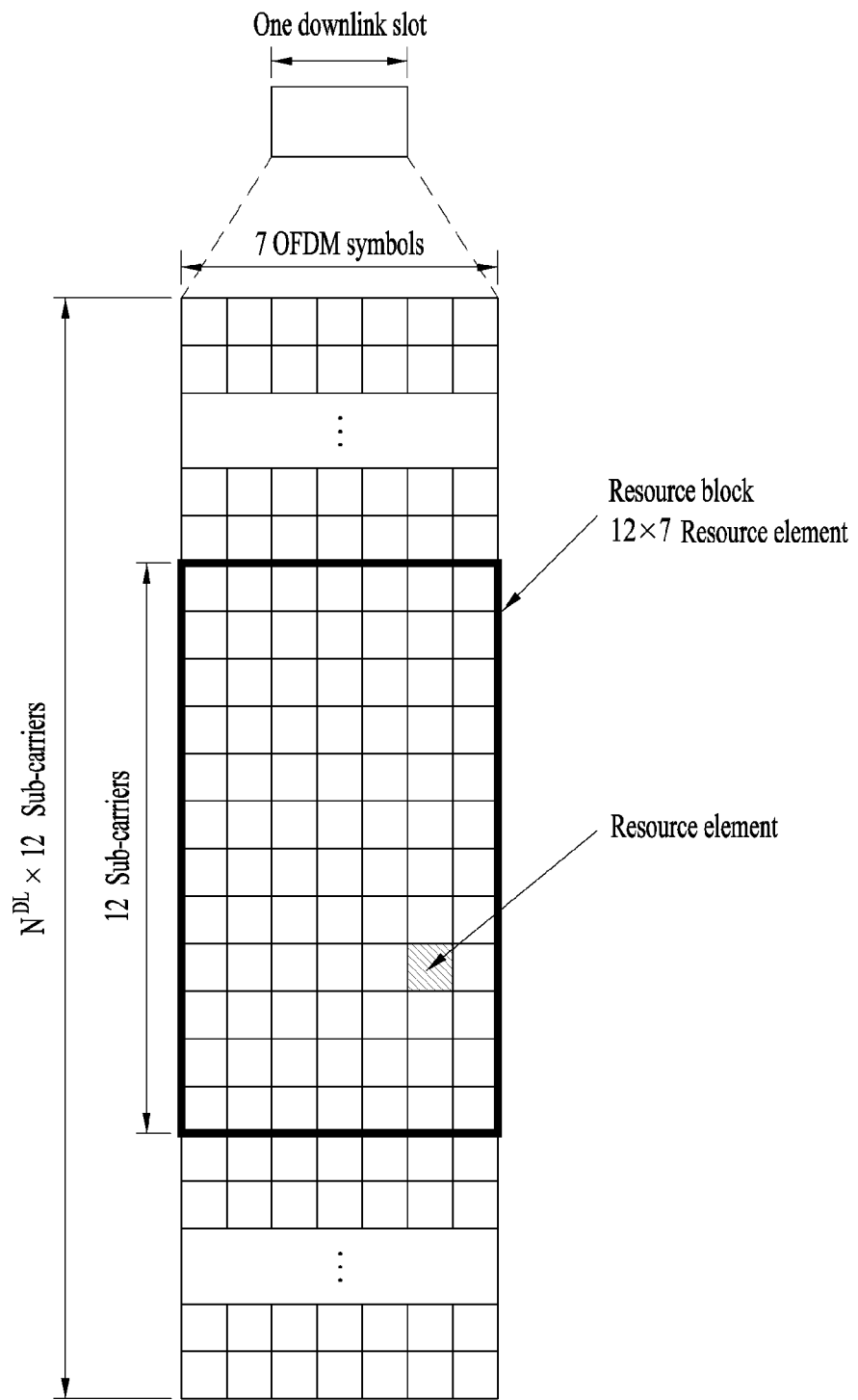
FIG. 3 is a diagram illustrating a resource grid of a downlink slot of 3GPP LTE/LTE-A system corresponding to one example of a wireless communication system.

FIG. 3 illustrates resource grid for one downlink slot in an exemplary 3GPP LTE/LTE-A system of a wireless communication system.

Referring to FIG. 3, a downlink slot includes a plurality of OFDM symbols in time domain. It is described herein that one downlink slot includes 7 OFDM symbols, and one resource block (RB) includes 12 subcarriers in frequency domain as an example. However, the present invention is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 4:
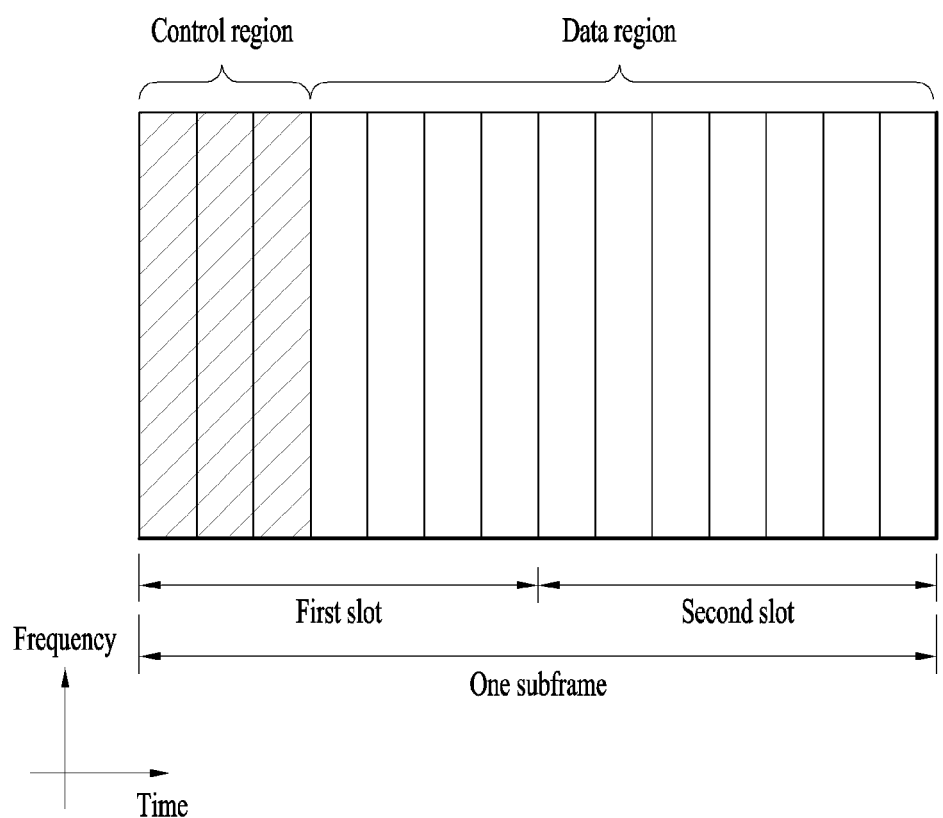
FIG. 4 is a diagram illustrating a structure of a downlink subframe of 3GPP LTE/LTE-A corresponding to one example of a wireless communication system.

FIG. 4 illustrates structure of downlink subframe of exemplary 3GPP LTE/LTE-A system of wireless communication system.

Referring to FIG. 4, a maximum of three or four OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). The DCI format selectively includes information of hopping flag, RB allocation, MCS(modulation coding scheme), RV(redundancy version), NDI(new data indicator), TPC(transmit power control), cyclic shift, DM RS(demodulation reference signal), CQI (channel quality information) request, HARQ process number, TPMI(transmitted precoding matrix indicator), PMI(precoding matrix indicator), confirmation, etc. according to usage.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
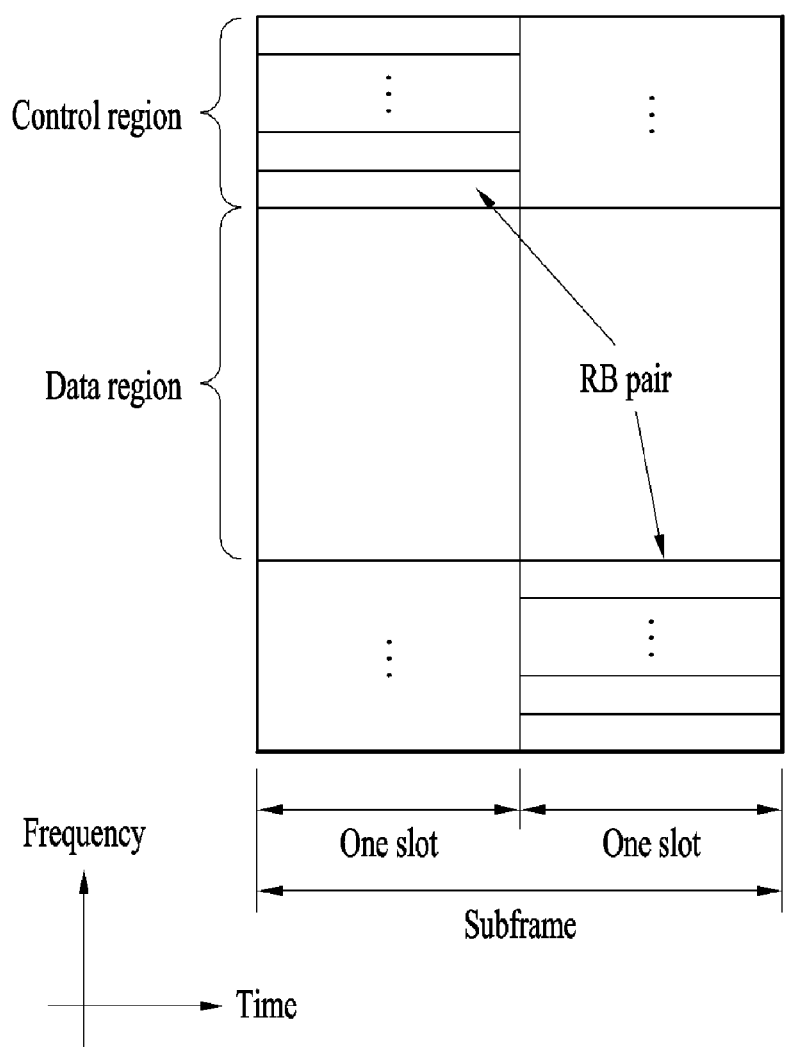
FIG. 5 is a diagram illustrating a structure of an uplink subframe of 3GPP LTE/LTE-A system corresponding to one example of a wireless communication system.

FIG. 5 illustrates structure of uplink subframe of exemplary 3GPP LTE.LTE-A of wireless communication system.

Referring to FIG. 5, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit ACK/NACK is transmitted as a response to a single downlink codeword and a 2-bit ACK/NACK is transmitted as a response to two downlink codewords.

Channel Quality Information (CQI): This is feedback information about a downlink channel. MIMO (Multiple Input Multiple Output)-related feedback information includes a rank indicator (RI), a precoding matrix indicator (PMI), and a precoding type indicator (PTI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

PDCCH (Physical Downlink Control CHannel) Transmission

The PDCCH is a downlink control channel and is configured to transmit a power control command for several UEs to a PDSCH for a specific UE. The PDCCH reserves maximum four OFDM symbols in a time domain, and indicates the number of OFDM symbols allocated to PDCCH by PCFICH. Meanwhile, the PDCCH is transmitted over a full system bandwidth in a frequency domain, and uses QPSK as modulation. Resources used for transmission of the PDCCH are referred to as control channel elements (CCEs), and include 36 resource elements (REs), whereby 72 bits may be transmitted through one CCE. The quantity of control information transmitted to the PDCCH is varied depending on a transmission mode. Control information according to each transmission mode is defined by a DCI format. The UE determines the presence of PDSCH/PUSCH transmission depending on a PDCCH decoding result, and PDCCH scrambling is made by UE ID information (C-RNTI) of a corresponding UE. That is, if the UE detects a DCI format transmitted by being scrambled by its UE ID, the UE receives PDSCH or transmits PUSCH by PDCCH control information. Generally, since there are a plurality of PDCCHs that can be transmitted for one subframe, the UE should identify the presence of control information transmitted thereto by performing decoding for the plurality of PDCCHs. However, complexity is increased in performing decoding for all PDCCHs which can be transmitted, whereby there is a limitation in the number of decoding times. If the UE transmits control information through the PDCCH, the UE may transmission the control information by concatenating one or more CCEs. This is referred to as CCE aggregation. CCE aggregation levels which are currently allowed are 1, 2, 4 and 8, and the CCE aggregation level 4 means that control information of the corresponding UE is transmitted by concatenation of 4 CCEs.

Hereinafter, PBCH and BRS design varied depending on the number of beam reference signals (BRSs) will be suggested. Procedures for PBCH decoding of the UE are defined based on the suggested PBCH and BRS design.

Figure 6:
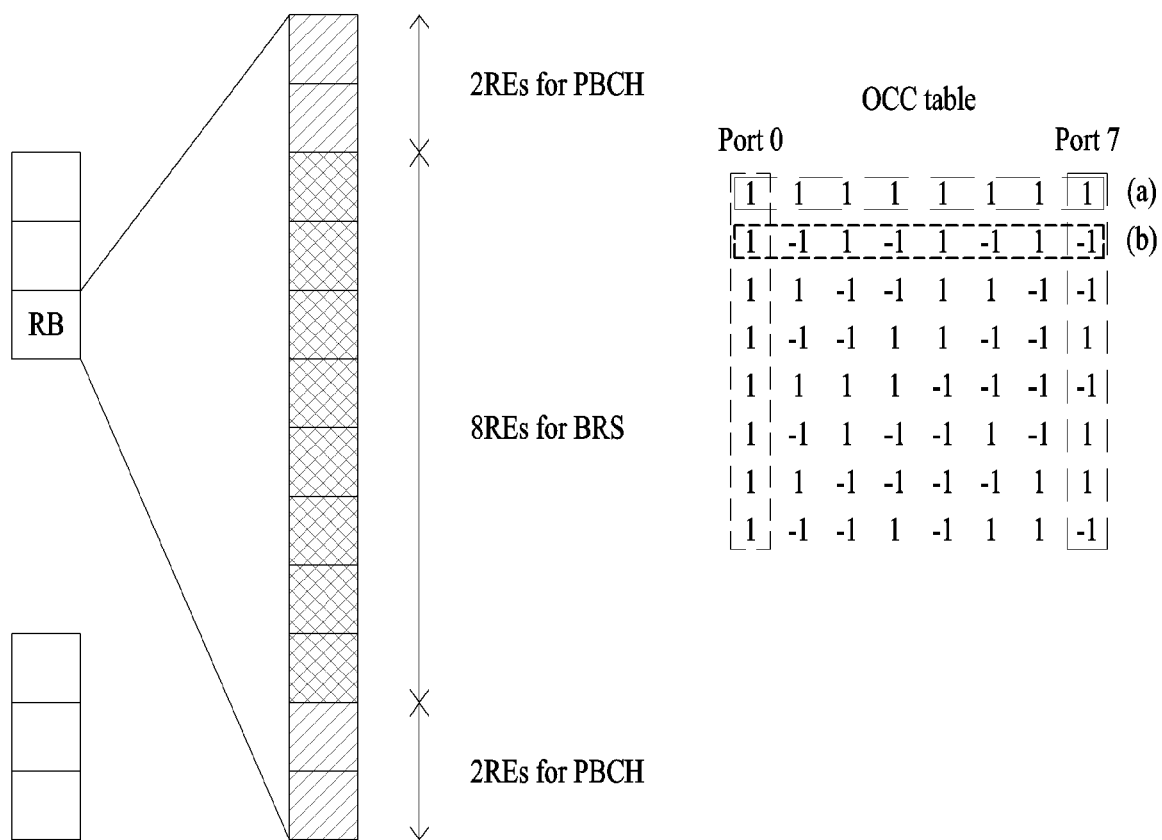
FIG. 6 is an exemplary view illustrating BRS and PBCH design with BRS ports=8 in a resource grid.

FIG. 6 is an exemplary view illustrating BRS and PBCH design with BRS ports=8 in a resource grid.

Referring to FIG. 6, the PBCH may be transmitted through two REs of each of both edges on a frequency domain in one RB, and the BRS may be transmitted through 8 REs. 8 BRS ports are defined by indexes from 0 to 7 (BRS ports 0 to 7), and the BRSs may be multiplexed into one OFDM symbol using Orthogonal Cover Code (OCC). Meanwhile, PBCH DMRS port may be defined as follows using two REs of (a) and (b) in FIG. 6.

In case of FDM mode, each of (a) and (b) is determined as a DMRS port 9. That is, (a) (i.e., [1 1 1 1 1 1 1 1]) displayed on a horizontal axis in an OCC table of FIG. 6 may be determined as a DMRS port 8, and (b) (i.e., [1 −1 1 −1 1 −1 1 −1]) may be determined as a DMRS port 9. In case of CDM mode, the DMRS port 8 is defined by (a)+(b), and the DMRS port 9 is defined by (a)-(b).

Hereinafter, for convenience of description, the DMRS port defined in the CDM mode will be described. Meanwhile, the PBCH is transmitted through the two DMRS ports. Space-Frequency Block Coding (SFBC) may be applied to the PBCH.

Embodiment 1

Figure 7:
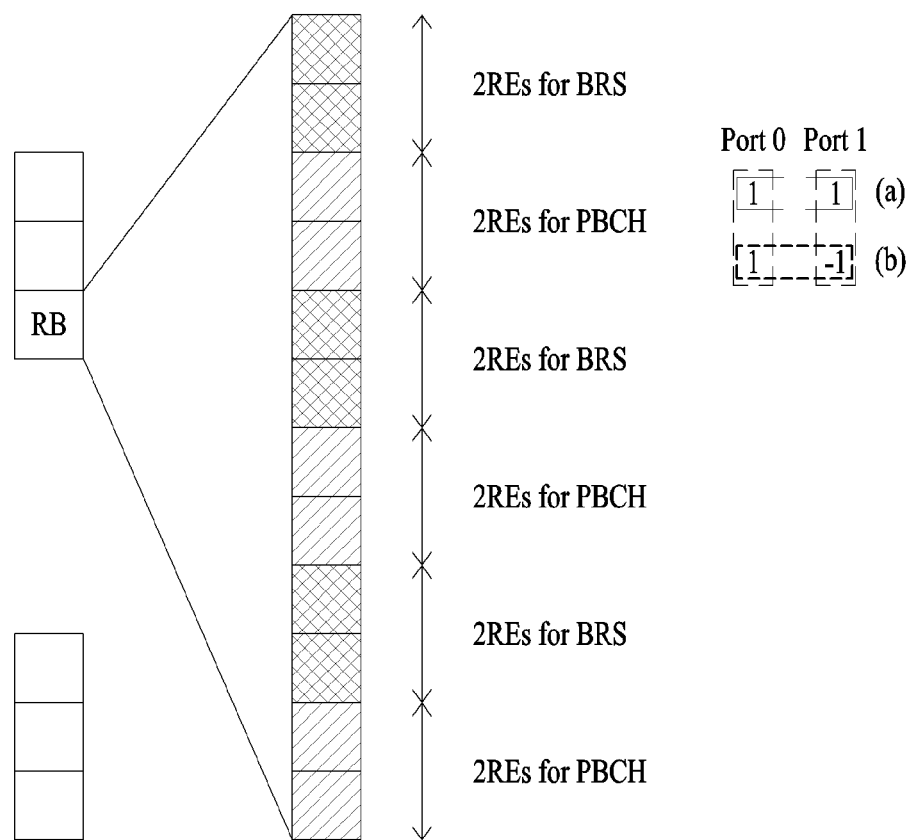
FIG. 7 is an exemplary view illustrating BRS and PBCH design with BRS ports=2 in a resource grid.
Figure 8:
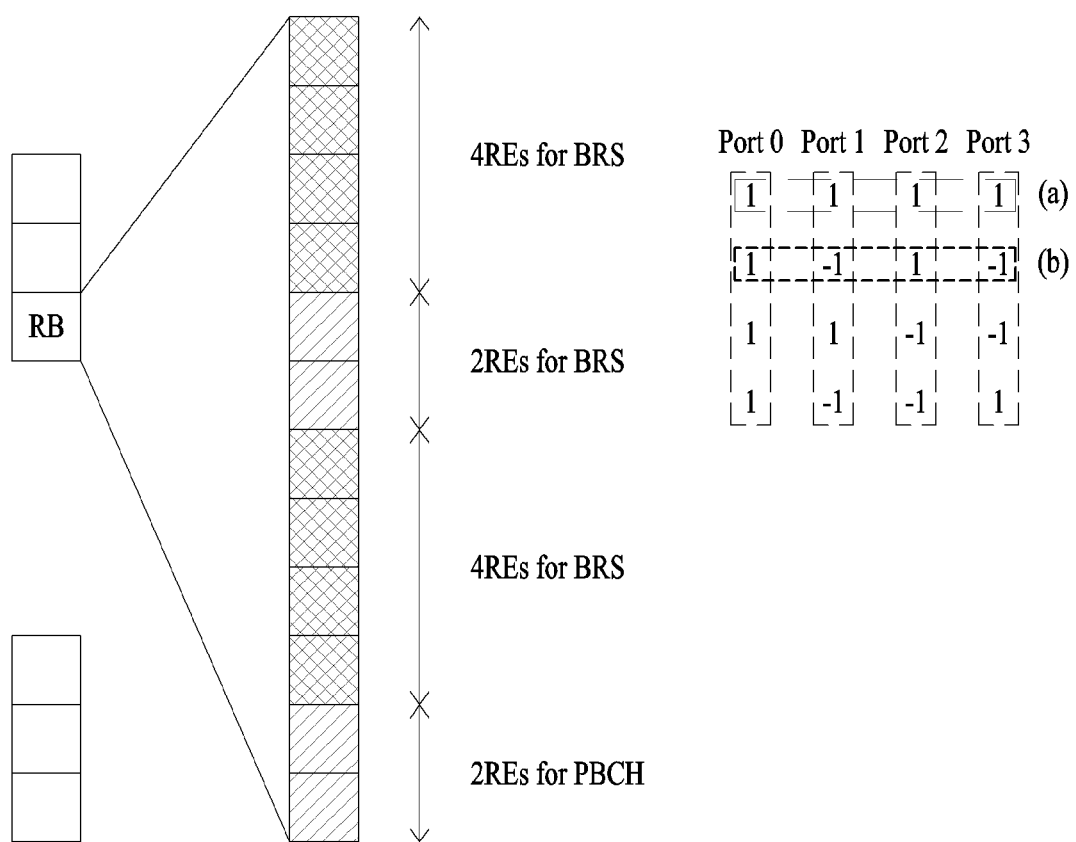
FIG. 8 is an exemplary view illustrating BRS and PBCH design with BRS ports=4 in a resource grid.

Method for Defining Positions of Beam Reference Signals (BRSs) Differently Depending on the Number of BRS Ports The positions of the BRSs may be defined differently depending on the number of BRS ports as shown in FIGS. 6 to 8. Information on the positions of the BRSs may previously be shared between the UE and the base station depending on the number of BRS ports. The UE may know a position or allocation pattern of the BRS corresponding to the number of BRS ports obtained based on the information previously shared if the number of BRS ports is obtained.

FIG. 6 illustrates a structure of PBCH and BRS when the number of BRS ports is 8. At this time, the DMRS port is defined at a spacing of 12 REs on a frequency axis. In the structure shown in FIG. 6, when the number of BRS ports is 8 or less, two DMRS ports may be defined regardless of the number of BRS ports. As a result, the UE may decode the PBCH even though the UE does not know the number of BRS ports. However, if channel selectivity is great on the frequency axis, channel estimation performance is degraded. The PBCH and BRS structure is varied depending on the number of BRS ports, whereby degradation of the channel estimation performance is minimized At this time, it is assumed that the UE knows the number of BRS ports.

FIG. 7 is an exemplary view illustrating BRS and PBCH design with BRS ports=2 in a resource grid.

As shown in FIG. 7, the DMRS may be defined at a spacing of four (4 REs on the frequency domain). Therefore, in comparison with FIG. 6, performance degradation by channel selectivity may be reduced. Also, two PBCH REs per one RB may be defined.

FIG. 8 is an exemplary view illustrating BRS and PBCH design with BRS ports=4 in a resource grid.

As shown in FIG. 8, the DMRS is defined at a spacing of six (6 REs on the frequency domain). Therefore, in comparison with FIG. 6, performance degradation by channel selectivity may be reduced. Also, two PBCH REs per one RB may be defined in the same manner as FIG. 7.

Embodiment 2

Method for Defining BRS Power Per RE Equally to or Differently From PBCH Power Per RE in Accordance With the Number of BRS Ports in the Embodiment 1

In FIG. 7 (the number of BRS ports=2) and FIG. 8 (the number of BRS ports=4), the number of REs allocated to BRS per RB is 6 in FIGS. 7 and 8 in FIG. 8. If the same BRS power per RE is applied to FIG. 7 and FIG. 8, coverage according to the structure of FIG. 7 is more reduced than coverage according to the structure of FIG. 8. To solve the problem that coverage is varied depending the number of BRSs, in the embodiment 2, the BRS power per RE and the PBCH power per RE are defined differently from or equal to each other depending on the number of BRSs.

For example, when the number of BRS ports is N, the BRS power per RE and the PBCH power per RE are defined as $\rho_{P=N}^{BRS}$ and $\rho_{P=N}^{PBCH}$, respectively. Equation 1 indicates the BRS power per RE according to the number of BRS ports, and Equation 2 indicates the PBCH power per RE according to the number of BRS ports.

$$\rho_{P=2}^{BRS} = \frac{4}{3}\rho_{P=4}^{BRS} = \frac{4}{3}\rho_{P=8}^{BRS} \qquad \text{[Equation 1]}$$

$$\rho_{P=2}^{PBCH} = \frac{4}{3}\rho_{P=4}^{PBCH} = \frac{4}{3}\rho_{P=8}^{PBCH} \qquad \text{[Equation 2]}$$

Referring to the Equations, the BRS power with BRS ports=2 is more boosted as much as 4/3 than the BRS power with BRS ports=4 or 8. In this case, although the number of BRS REs per RB is reduced from 8 to 6 when the number of ports is 2, BRS total power per port allocated to one OFDM symbol is equally maintained. Therefore, the port 2 satisfies the same coverage as that of each of port 4 and port 8.

Meanwhile, referring to the Equation 2, it is noted that when the number of BRS ports is 2, the PBCH power per RE is reduced to 2/3 of the PBCH power per RE when the number of BRS ports is 4 or 8. However, since the number of PBCH REs per RB is increased from 4 to 6, PBCH total power per port allocated to one OFDM symbol is equally maintained.

Embodiment 3

Method for Defining BRS Power Per RE Equally to or Differently From PBCH Power Per RE in Accordance With the Number of BRS Ports in the Embodiment 2

For example, when the number of BRS ports is N, a power ratio of BRS to PBCH per RE is defined as $$\beta_{P=N} = \frac{\rho_{P=N}^{BRS}}{\rho_{P=N}^{PBCH}}.$$

It is assumed that BRS power per RE and PBCH power per RE are equal to each other ($\rho_{P=8}^{BRS}=\rho_{P=8}^{PBCH}$) when the number of BRS ports is 8, and BRS power per RE and PBCH power per RE are equal to each other when the number of BRS ports is 4. In this case, if the Equation 1 and the Equation 2 are used as they are, the power ratio may be indicated as expressed by the following Equation 3 in accordance with the number of BRS ports per RE.

$$\beta_{P=4}=\beta_{P=8}=1, \beta_{P=2}=2 \qquad \text{[Equation 3]}$$

Referring to the Equation 3, it is noted that a power ratio of BRS to PBCH per RE is 1 when the number of BRS ports is 4 or 8 and a power ratio of BRS to PBCH per RE is 2 when the number of BRS ports is 2. In this way, BRS power per RE and PBCH power per RE may be equal to or different from each other in accordance with the number of BRS ports.

Embodiment 4

The UE may determine the number of beam reference signal (BRS) ports and/or a power ratio (see Equation 3) of BRS to PBCH per RE by using a synchronization signal. In this case, the synchronization signal means PSS/SSS/ESS (Extended Synchronization Signal). The UE may extract a DMRS from the BRS based on the determined number of BRSs. The UE may decode the PBCH by using the channel estimated from the DMRS and the power ratio of BRS to PBCH.

As an example, an example of determining the number of BRSs by using the synchronization signal ESS will be described.

A scheme for defining a signature based on a root value or scrambling code of the ESS (Extended Synchronization Signal) will be introduced. At this time, a beam period, synch subframe index/beam subframe index, and the number of BRSs may be defined in the signature. Therefore, if the number of BRSs is defined in the signature, the UE determines the number of BRSs without decoding of another physical channel (for example, PBCH).

UE procedure for PBCH decoding will be described.

First of all, 1) the UE may determine the number of BRS ports from the synchronization signal. 2) The UE may extract BRS and/or DMRS based on the number of BRS ports. 3) The UE performs channel estimation from the DMRS and performs interpolation. 4) The UE may compensate for the power ratio of BRS to PBCH according to the number of BRS ports by using the Equation 3 for the channel estimated based on the DMRS. 5) The UE may decode PBCH based on the compensated channel Meanwhile, the power ratio of BRS to PBCH may be compensated by channel estimation from the DMRS or PBCH decoding. If the power ratio is 1, compensation may be omitted.

As described above, the PBCH and BRS design varied depending on the number of BRSs has been suggested as above. The UE procedure for PBCH decoding has been suggested based on the above design.

Figure 9:
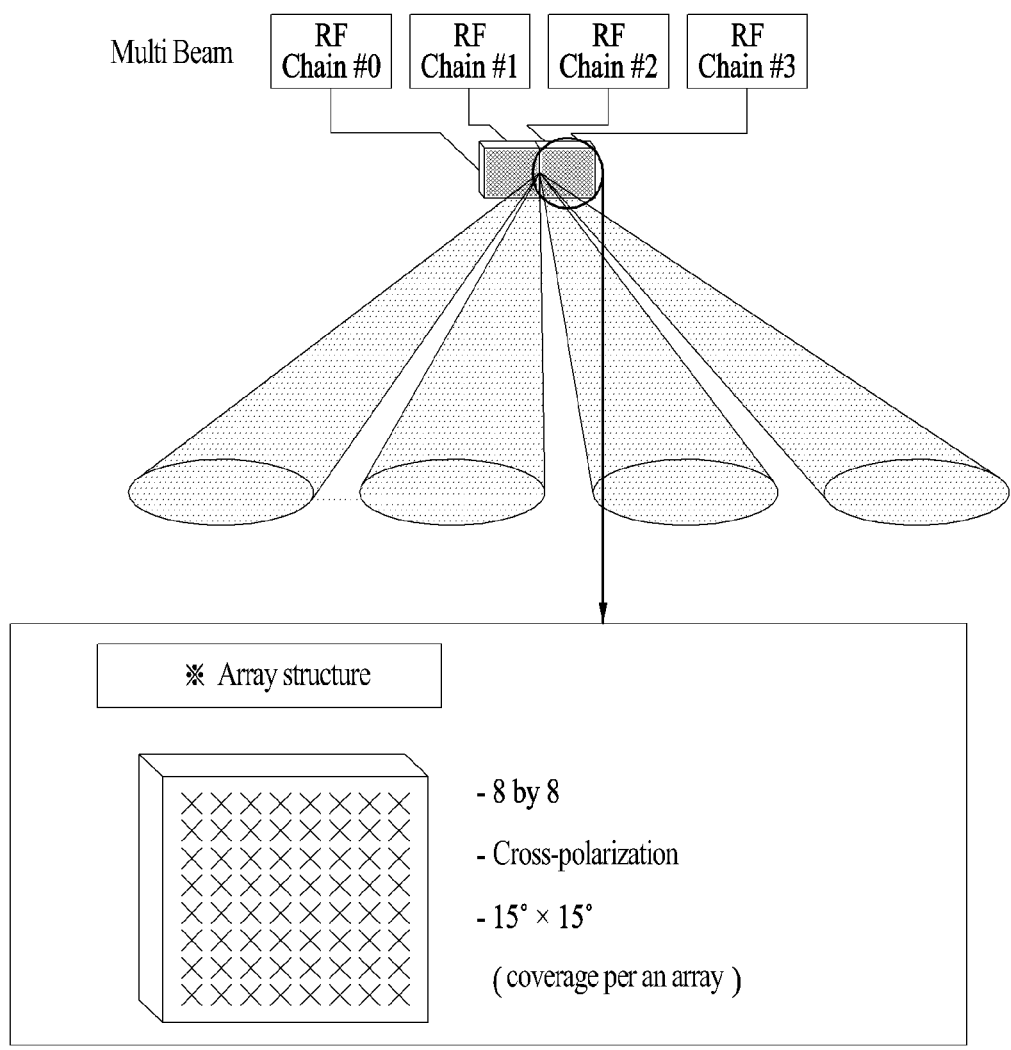
FIG. 9 is an exemplary view illustrating advantageous effects of the present invention.

FIG. 9 is an exemplary view illustrating advantageous effects of the present invention.

The base station may generate a plurality of analog beams by using a plurality of panels. As an example, as shown in FIG. 9, the base station has two panels, and may generate a total of four analog beams when each panel (see array structure) is comprised of a cross-pole. At this time, a sequence corresponding to each beam is multiplexed into 4 REs (4 REs for BRS) by CDM as shown in FIG. 8. Alternatively, each beam may be multiplexed into different REs by FDM. If the base station has 8 analog beams, 8 BRSs are required. Of course, the base station may define only 4 or 2 analog beams by combination of 8 analog beams. To this end, each beam may be multiplexed into 8 REs by CDM as shown in FIG. 6.

Meanwhile, if the number of BRSs is increased, a DMRS frequency interval based on the BRS is increased, whereby throughput is reduced in view of channel selectivity. As a result, according to the invention suggested in this patent, the base station having a small number of BRSs (a small number of analog beams) may make the DMRS frequency interval based on the BRS narrow by reducing the number of REs (the number of REs for BRS) in which the BRS is defined, whereby robustness may be given to channel frequency selectivity.

The BRS of the present invention may be referred to as a CSI-RS (or MRS) for beam management. In the present invention, the number of BRSs may be configured for the UE cell-specifically or UE-specifically. If the number of BRSs is configured cell-specifically, the UE may know the number of BRSs through a Master Information Block (MIB) or a system information block (SIB). If the number of BRSs is configured UE-specifically, the UE may know the number of BRSs through RRC (Radio Resource Control) signaling or MAC-CE (Control Element).

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for signaling for a phase feedback and the device for the same are industrially applicable to various wireless communication systems such as 3GPP LTE/LTE-A and 5G system.

The invention claimed is:

1. A method for receiving a beam reference signal (BRS) and a physical broadcast channel (PBCH) by a user equipment (UE) in a wireless communication system, the method comprising:
    determining a power ratio of the BRS to the PBCH per resource element (RE) based on a number of BRS ports;
    detecting the BRS and a demodulation reference signal (DMRS) based on the number of BRS ports; and
    determining whether to compensate the determined power ratio of the BRS to the PBCH for a channel estimated based on the DMRS.

2. The method of claim 1, wherein the determining includes determining that the power ratio of the BRS to the PBCH is not compensated when the determined power ratio of the BRS to the PBCH is 1, and
    wherein the method further comprises decoding the PBCH based on the channel not compensated.

3. The method of claim 2, wherein the number of BRS ports is 4 or 8.

4. The method of claim 1, wherein the determining includes determining that the power ratio of the BRS to the PBCH is compensated when the determined power ratio of the BRS to the PBCH is not 1, and
    wherein the method further comprises decoding the PBCH based on the channel compensated by compensating the determined power ratio of the BRS to the PBCH.

5. The method of claim 4, wherein the number of BRS ports is 2.

6. The method of claim 1, further comprising:
    receiving a synchronization signal; and
    obtaining the number of BRS ports by using the synchronization signal.

7. The method of claim 6, wherein the synchronization signal includes a Primary Synchronization Signal (PSS), a Secondary Synchronization Signal (SSS), or an Extended Synchronization Signal (ESS).

8. The method of claim 6, wherein the number of BRS ports is indicated by a signature defined based on a scrambling code of the synchronization signal.

9. The method of claim 1, wherein the number of BRS ports is configured cell-specifically or UE-specifically.

10. A user equipment (UE) for receiving a beam reference signal (BRS) and a physical broadcast channel (PBCH) in a wireless communication system, the UE comprising:
    a processor configured to determine a power ratio of the BRS to the PBCH per resource element (RE) based on a number of BRS ports,
    detect the BRS and a demodulation reference signal (DMRS) based on the number of the BRS ports, and
    determine whether to compensate the determined power ratio of the BRS to the PBCH for a channel estimated based on the DMRS.

11. The UE of claim 10, wherein the processor determines that the power ratio of the BRS to the PBCH is not compensated when the determined power ratio of the BRS to the PBCH is 1, and
    wherein the processor is configured to decode the PBCH based on the channel not compensated.

12. The UE of claim 11, wherein the number of BRS ports is 4 or 8.

13. The UE of claim 10, wherein the processor determines that the power ratio of the BRS to the PBCH is compensated when the determined power ratio of the BRS to the PBCH is not 1, and
    wherein the processor is configured to decode the PBCH based on the channel compensated by compensating the determined power ratio of the BRS to the PBCH.

14. The UE of claim 13, wherein the number of BRS ports is 2.

15. The UE of claim 10, further comprising:
    a receiver configured to receive a synchronization signal; and
    wherein the processor is configured to obtain the number of BRS ports by using the synchronization signal.

16. The UE of claim 15, wherein the synchronization signal includes a Primary Synchronization Signal (PSS), a Secondary Synchronization Signal (SSS), or an Extended Synchronization Signal (ESS).

17. The UE of claim 15, wherein the processor obtains the number of BRS ports indicated by a signature defined based on a scrambling code of the synchronization signal.

18. The UE of claim 10, wherein the number of BRS ports is configured cell-specifically or UE-specifically.

* * * * *